US005250337A

United States Patent [19]

Treichel et al.

[11] Patent Number: 5,250,337

[45] Date of Patent: Oct. 5, 1993

[54] MULTI-LAYERED LABEL FOR ADHESIVELY AFFIXING TO CONTAINERS

[75] Inventors: Heinz Treichel, Dormagen; Norbert Schiffer, Rommerskirchen, both of Fed. Rep. of Germany; Franz P. Schüller, Cascais, Portugal

[73] Assignee: Bayer Aktiengesellschaft, Leverkusen, Fed. Rep. of Germany

[21] Appl. No.: 950,382

[22] Filed: Sep. 23, 1992

[30] Foreign Application Priority Data

Sep. 30, 1991 [DE] Fed. Rep. of Germany ....... 4132493

[51] Int. Cl.[5] .......... B32B 9/00

[52] U.S. Cl. .......... 428/43; 283/5; 428/131; 428/343; 428/192

[58] Field of Search .......... 428/192, 343, 131, 43; 283/81, 5; 40/2 R

[56] References Cited

U.S. PATENT DOCUMENTS

| | | | |
|---|---|---|---|
| 4,551,373 | 11/1985 | Conlon | 428/43 |
| 4,621,442 | 11/1986 | Mack | 40/2 R |
| 4,744,161 | 5/1988 | Instance | 281/5 |
| 4,744,591 | 6/1988 | Instance | 281/5 |
| 4,830,406 | 6/1983 | Instance | 283/81 |

FOREIGN PATENT DOCUMENTS

| | | |
|---|---|---|
| 0130053 | 6/1984 | European Pat. Off. . |
| 2141994 | 6/1984 | United Kingdom . |

*Primary Examiner*—Patrick J. Ryan
*Assistant Examiner*—Abraham Bahta
*Attorney, Agent, or Firm*—Sprung Horn Kramer & Woods

[57] ABSTRACT

A multi-layered label for adhesively affixing to containers, such as bottles, cans, canisters, allows, at least with respect to its top sheet and intermediate sheet, a more convenient reading of the information printed thereupon if a base section (1) having an intermediate section (3) which can be turned out to the right and can be detached along a fold (4) is provided, this intermediate section (3) being covered by a top section (5) overlapping it on the right, this top section (5) being glued to the base section (1) in the left-hand edge region (6), and the top section (5) having to the left a tear-open perforation (10) and to the right a tear-off perforation (13), so that this top section (5) also can be obtained as a separate sheet.

1 Claim, 1 Drawing Sheet

MULTI-LAYERED LABEL FOR ADHESIVELY AFFIXING TO CONTAINERS

Figure 1:
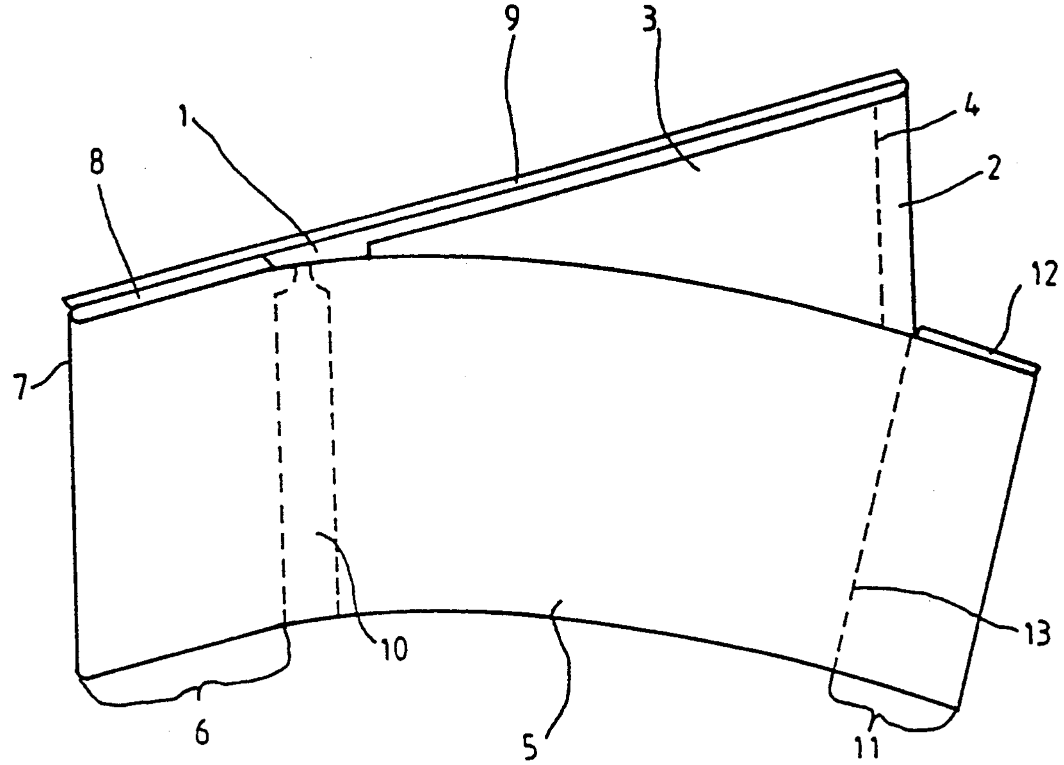

The invention relates to a multi-layered label for adhesively affixing to containers, such as bottles, cans, canisters.

Frequently containers have to be provided with labels which have large information areas in order to convey to the consumer of the container contents instructions for use, composition of the contents etc, for which purpose use is made of multi-layered labels.

The labels available on the market until now have the disadvantage that, to read the information, the container has to be held in the hand, irrespective of on which layer this information is printed.

The object is to provide a label of the type mentioned at the beginning on which at least the information on the top layer and the intermediate layer can be read more conveniently.

This object is achieved by a base section, delimited by a fold from at least one shorter intermediate section and having, at the latest after labelling, a layer of glue on the reverse side, at least in places, and a top section, arranged over the intermediate section, top section and base section being joined to each other in the left-hand edge region by a gluing, and the top section having to the right of this gluing a tear-open perforation and overlapping with the right-hand edge region the intermediate section and the base section, and this overlapping edge region having, at the latest after labelling, a gluing on the reverse side, the right-hand edge region of the top section being delimited by a tear-off perforation, and a tear-off perforation being provided in or close to the fold between base section and intermediate section.

Such a label can be produced from a strip blank by folding or from a strip blank from which the base section and the intermediate section are formed by folding, whereas the top section comprises a separate sheet which is glued to the base section. The gluing between top section and base section in the left-hand edge region gives the label a certain rigidity at this point, making it better for the labelling machines to process and also helping the opening of the tear-open perforation. The overlapping right-hand edge region serves for fixing the top sheet on the container. If the label is to be adhesively affixed to a container of round cross-section, such as a bottle or can, and if the length of the label is matched to the circumference of such a container, the right-hand edge region can be adhesively attached to the left-hand edge region as in the case of a banderole. Thanks to the additional tear-off perforation in the right-hand edge region, the top section can be detached completely in the form of a sheet and in this way ideally handled for reading the imprint. In the same way, the intermediate section can be detached along the tear-off perforations in the form of a sheet and handled more easily. This tear-off perforation of the intermediate sheet lies either directly in the fold or just alongside it.

The novel label can be produced on commercially conventional label manufacturing machines and processed by commercially conventional labelling machines.

In the drawing, the novel label is three-dimensionally represented purely diagrammatically in an exemplary embodiment and is explained in further detail below:

The label comprises a base section 1, which is attached in one piece via a fold 2 to an intermediate section 3. Close to this fold 2, the intermediate section 3 has a tear-off perforation 4. The intermediate section 3 is folded-in towards the inside and is covered by a top section 5. The latter is joined in the left-hand edge region 6 by a fold 7 and a gluing 8 to the base section 1, which already has a layer of glue 9 on the reverse side. To the right of the gluing 8, a tear-open perforation 10 is provided in the top section 5. The top section 5 overlaps with its right-hand edge region 11 the base section 1 with folded-in intermediate section 3 and already has a gluing 12 on the reverse side. To the left of this gluing 12, a tear-off perforation 13 is provided.

According to an alternative embodiment, the fold 7 is omitted, because a separate sheet is used as the top section.

We claim:

1. Multi-layered label as shown in FIG. 1 for adhesively affixing to containers, such as bottles, cans, canisters, characterised by a base section (1), delimited by a fold (2) from at least one shorter intermediate section (3) and having, a layer of glue (9) on the reverse side, and a top section (5), arranged over the intermediate section (3), top section (5) and base section (1) being joined to each other in the left-hand edge-region (6) by a gluing (8), and the top section (5) having to the right of this gluing (8) a tear-open perforation (10) and overlapping with the right-hand edge region (11) the intermediate section (3) and the base section (1), and this overlapping edge region (11) having, a gluing (12) on the reverse side, the right-hand edge region (11) of the top section (5) being delimited by a tear-off perforation (13), and a tear-off perforation (4) being provided in or close to the fold (2) between base section (1) and intermediate section (3).

* * * * *